(12) United States Patent
Lounnas et al.

(10) Patent No.: US 11,579,638 B2
(45) Date of Patent: Feb. 14, 2023

(54) METHOD AND UNIT FOR CONTROLLING ELECTRICAL DEVICES OF AN AUTOMOTIVE VEHICLE

(71) Applicants: Continental Automotive France, Toulouse (FR); Continental Automotive GmbH, Hannover (DE)

(72) Inventors: Amar Lounnas, Noe (FR); Jean-Claude Prouvoyeur, Saint-Jean (FR); Christophe Pradelles, Fiac (FR)

(73) Assignees: Continental Automotive France; Continental Automotive GmbH

( * ) Notice: Subject to any disclaimer, the term of this patent is extended or adjusted under 35 U.S.C. 154(b) by 924 days.

(21) Appl. No.: 16/324,335

(22) PCT Filed: Aug. 22, 2017

(86) PCT No.: PCT/FR2017/052258
§ 371 (c)(1),
(2) Date: Feb. 8, 2019

(87) PCT Pub. No.: WO2018/042105
PCT Pub. Date: Mar. 8, 2018

(65) Prior Publication Data
US 2021/0240210 A1   Aug. 5, 2021

(30) Foreign Application Priority Data
Aug. 30, 2016   (FR) ........................................ 1658055

(51) Int. Cl.
*G05D 23/19* (2006.01)
*B60R 16/03* (2006.01)

(52) U.S. Cl.
CPC ......... *G05D 23/1917* (2013.01); *B60R 16/03* (2013.01)

(58) Field of Classification Search
None
See application file for complete search history.

(56) References Cited

U.S. PATENT DOCUMENTS 7,099,756 B2   8/2006   Sato
2007/0202717 A1   8/2007   Vera et al.
(Continued)

FOREIGN PATENT DOCUMENTS

CN   1748359 A   3/2006
CN   101029915 A   9/2007
(Continued)

OTHER PUBLICATIONS

International Search Report and Written Opinion for International Application No. PCT/FR2017/052258, dated Nov. 27, 2017—13 pages.

*Primary Examiner* — Daniel Kessie
*Assistant Examiner* — Terrence R Willoughby
(74) *Attorney, Agent, or Firm* — RatnerPrestia

(57) ABSTRACT

A method for controlling an item of electrical equipment of a motor vehicle including a device for controlling the item of equipment including a microcontroller, which is configured to generate an AC electrical signal for controlling the item of equipment characterized by its duty cycle, and a driver interface that is characterized by a maximum operating temperature threshold beyond which the driver interface is inoperative. The method includes determining the internal temperature of the driver interface, comparing the determined internal temperature with a first predetermined warning threshold and decreasing the duty cycle of the electrical signal when the first warning threshold has been exceeded so as to limit the power of the electrical signal and thus to keep the internal temperature of the driver interface below its maximum operating temperature threshold.

11 Claims, 4 Drawing Sheets

(56) References Cited

U.S. PATENT DOCUMENTS

| | | | |
|---|---|---|---|
| 2008/0067983 A1 | 3/2008 | Okamoto | |
| 2010/0231136 A1* | 9/2010 | Reisenauer | H05B 45/3725 |
| | | | 315/276 |
| 2011/0144860 A1 | 6/2011 | Burnham | |
| 2011/0193542 A1 | 8/2011 | Kwok et al. | |
| 2012/0280807 A1* | 11/2012 | Kulkarni | H05B 45/10 |
| | | | 340/475 |

FOREIGN PATENT DOCUMENTS

| | | |
|---|---|---|
| CN | 101852351 A | 10/2010 |
| CN | 102045014 A | 5/2011 |
| CN | 102299508 A | 12/2011 |
| CN | 102497161 A | 6/2012 |

* cited by examiner

METHOD AND UNIT FOR CONTROLLING ELECTRICAL DEVICES OF AN AUTOMOTIVE VEHICLE

CROSS REFERENCE TO RELATED APPLICATIONS

This application is the U.S. National Phase Application of PCT International Application No. PCT/FR2017/052258, filed Aug. 22, 2017, which claims priority to French Patent Application No. 1658055, filed Aug. 30, 2016, the contents of such applications being incorporated by reference herein.

FIELD OF THE INVENTION

The invention relates to the field of motor vehicles and pertains more particularly to a method and a device for controlling a plurality of items of electrical equipment of a motor vehicle.

BACKGROUND OF THE INVENTION

A motor vehicle comprises, in a known manner, a plurality of items of electrical equipment that are controlled by a device that is commonly referred to as the body control module (BCM).

This device makes it possible for example to activate the controls for the vehicle lights (brake lights, indicator lights, fog lights, etc.), the controls for the front and rear windshield wipers or the control for unlocking the doors of the vehicle.

To this end, the device comprises a plurality of connectors, each connected to an item of equipment, and a microcontroller allowing each item of equipment to be driven via a dedicated driver interface, commonly called a "driver", that is connected to the associated connector.

This driver interface takes the form of an electronic circuit allowing current to be delivered to the item of equipment according to on-off switching performed by a transistor or a relay, for example.

Such a driver interface is configured to operate up to a predetermined maximum operating temperature threshold, for example 150° C., beyond which it becomes inactive, thereby preventing the corresponding item of equipment from being controlled.

More specifically, some of these components may be destroyed if the maximum operating temperature threshold is reached, while some other components have an integrated thermal trip that inhibits the driver interface until the temperature of said components falls back below another previously defined temperature threshold and yet other components have an integrated thermal trip that definitively inhibits the driver interface.

However, it is observed that the temperature of the driver interface can often exceed this maximum operating temperature threshold, in particular when the ambient temperature is high and when the items of electrical equipment of the vehicle are in use.

It is therefore important to ensure that some of these items of equipment are not deactivated and that they are always operational, in particular the brake lights and the indicator lights of the vehicle, in order to guarantee the safety of the driver and of his or her passengers.

SUMMARY OF THE INVENTION

An aspect of the invention aims to overcome these drawbacks, at least in part, by providing a straightforward, reliable and effective solution for controlling the equipment of a motor vehicle at high temperature.

To this end, a first aspect of the invention is method for controlling at least one item of electrical equipment of a motor vehicle, said vehicle comprising a device for controlling said item of equipment, said device comprising a microcontroller that is configured to generate an AC electrical signal for controlling the item of equipment, said signal being characterized by its duty cycle, the device comprising at least one driver interface that is configured to control the item of equipment on the basis of the electrical signal generated by said microcontroller, said driver interface being characterized by a maximum operating temperature threshold beyond which the driver interface is inoperative, said method being noteworthy in that it comprises:

a step of determining the internal temperature of the driver interface;

a step of comparing the determined internal temperature with a first predetermined warning threshold; and a step of decreasing the duty cycle of the electrical signal when the first warning threshold has been exceeded so as to limit the power of the AC electrical signal for controlling the item of equipment and thus to keep the internal temperature of the driver interface below its maximum operating temperature threshold.

The method according to an aspect of the invention thus allows power pulse-width modulation in order to keep the internal temperature of the driver interface below its maximum operating temperature threshold and thus to allow the item of equipment to be always controllable. The method according to the invention makes it possible in particular to adjust the performance of the item of equipment according to the operating temperature of the driver interface, thus ensuring that this interface remains active and continues to control the item of equipment.

Advantageously, the decrease in the duty cycle of the AC electrical signal for controlling the item of equipment is inversely proportional to the ratio of the internal temperature of the driver interface to the first warning threshold. This makes it possible to adjust the control of the item of equipment by the driver interface in a straightforward and efficient manner.

Advantageously, the method comprises, subsequent to the decrease step, a step of increasing the duty cycle of the electrical signal when the internal temperature of the driver interface is lower than a second warning threshold, which is lower than or equal to the first warning threshold, in order to increase the power of the AC electrical signal for controlling the item of equipment. This advantageously allows the performance of the item of equipment to be increased as soon as the temperature of the driver interface has decreased enough for it to be able to resume operation by being controlled by a signal having a high duty cycle.

Advantageously, the driver interface comprising a sensor for measuring its internal temperature, the internal temperature of the driver interface is determined by directly measuring said internal temperature by means of said measurement sensor.

Advantageously, the device comprising a module for measuring the ambient temperature of said device, outside the driver interface, the method comprises a step of measuring the ambient temperature of the device by means of said measurement module, the internal temperature of the driver interface then being determined by applying a mathematical relation to the measured ambient temperature.

The invention also relates to a device for controlling at least one item of electrical equipment of a motor vehicle, said device comprising a microcontroller that is configured to generate an AC electrical signal for controlling the item of equipment, said signal being characterized by its duty cycle, the device comprising at least one driver interface that is configured to control the item of equipment on the basis of the electrical signal generated by said microcontroller, said driver interface being characterized by a maximum operating temperature threshold beyond which the driver interface is inoperative, said device being noteworthy in that the microcontroller is configured:
  to determine the internal temperature of the driver interface;
  to compare the determined internal temperature with a first predetermined warning threshold; and
  to decrease the duty cycle of the electrical signal when the first warning threshold has been exceeded so as to limit the power of the AC electrical signal for controlling the item of equipment and thus to keep the internal temperature of the driver interface below its maximum operating temperature threshold.

Preferably, the decrease in the duty cycle of the AC electrical signal for controlling the item of equipment is inversely proportional to the ratio of the internal temperature of the driver interface to the first warning threshold. This makes it possible to adjust the control of the item of equipment by the driver interface in a straightforward and efficient manner.

Advantageously, the microcontroller is configured to compare the determined internal temperature with a second predetermined warning threshold, which is lower than or equal to the first warning threshold, and to increase the duty cycle of the electrical signal when the internal temperature of the driver interface is lower than said second predetermined warning threshold so as to maintain a duty cycle that is as high as possible and thus ensure the efficiency of the items of electrical equipment of the motor vehicle.

Advantageously, the driver interface comprises a sensor for measuring its internal temperature.

Advantageously, the device comprises a module for measuring the ambient temperature of said device.

An aspect of the invention lastly relates to a motor vehicle comprising a control device such as presented above and at least one item of electrical equipment that is electrically connected to said device in order to be controlled by said device.

BRIEF DESCRIPTION OF THE DRAWINGS

Other features and advantages of aspects of the invention will become apparent in the following description provided with reference to the appended figures that are given by way of non-limiting examples and in which identical reference numbers are given to similar objects.

DETAILED DESCRIPTION OF THE PREFERRED EMBODIMENTS

The device according to an aspect of the invention is intended to be mounted in a motor vehicle so that certain items of electrical equipment of the vehicle, performing in particular safety functions, remain operational at high temperature.

By way of example, these items of equipment may be the lights of the vehicle (brake lights, indicator lights, fog lights, etc.), the front and rear windshield wipers or the mechanism for unlocking the doors of the vehicle.

The term "motor vehicle" is understood to mean a road vehicle propelled by at least one internal combustion engine, or at least one electric motor or at least one gas turbine such as, for example, a car, a van, a truck, etc.

Figure 1:
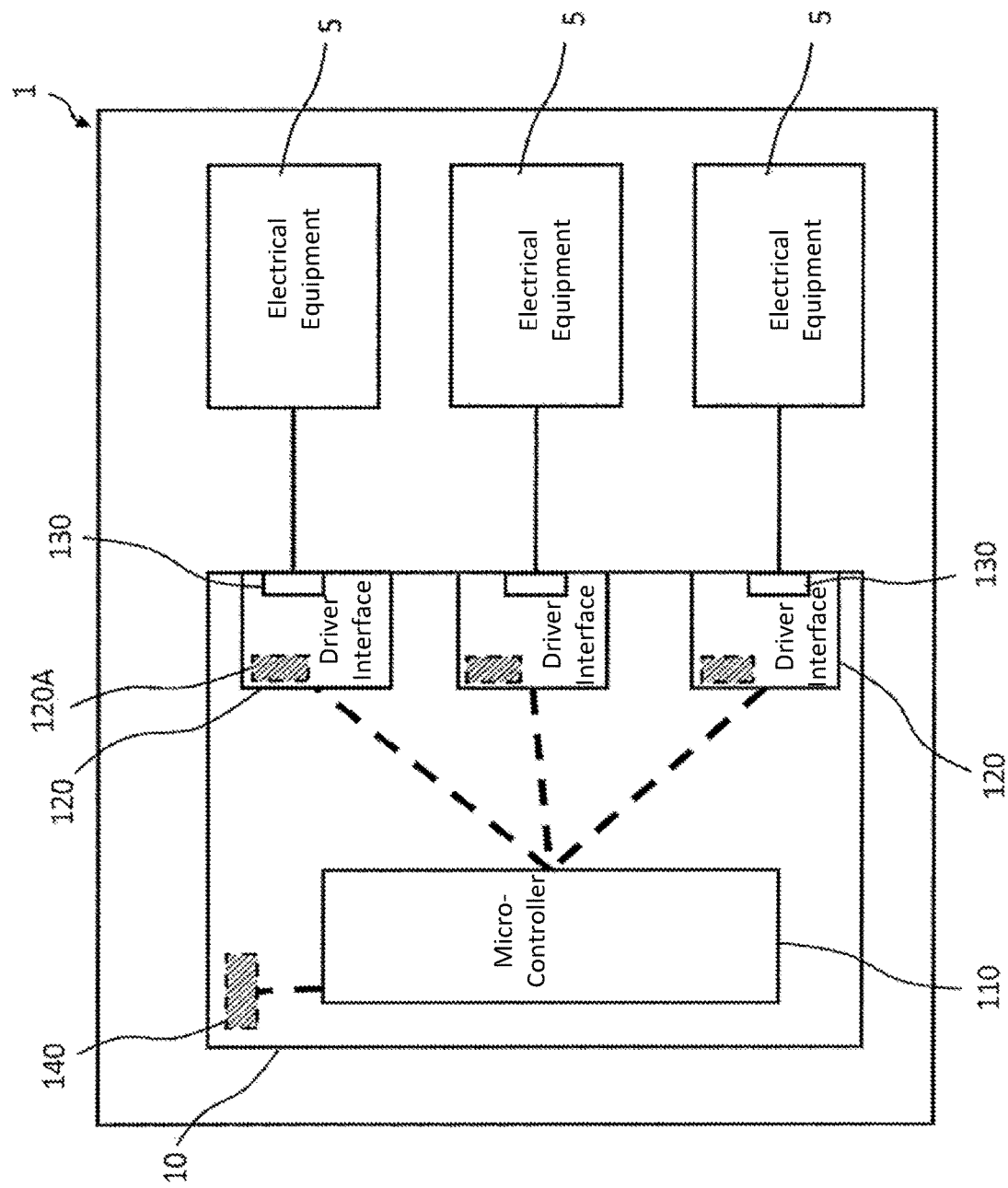
FIG. 1 schematically shows one embodiment of a control device according to an aspect of the invention.

With reference to FIG. 1, the vehicle 1 comprises a plurality of items of electrical equipment 5 and a device 10 allowing said items of electrical equipment 5 to be controlled.

The device 10 comprises a microcontroller 110, a plurality of driver interfaces 120 and a plurality of associated output connectors 130.

The microcontroller 110 is first and foremost configured to generate an AC electrical signal for controlling each of the items of electrical equipment 5.

This signal is a pulsed voltage signal that is characterized by its duty cycle $\gamma$ and that allows the item of equipment to be controlled according to said duty cycle $\gamma$. The duty cycle $\gamma$ of an electrical signal refers to the ratio of the duration for which the electrical signal is active in a determined period to the total duration of said period. This duty cycle $\gamma$ varies, as a percentage, from 0% to 100%. Operating according to a duty cycle $\gamma$ in this way allows the service life of certain items of electrical equipment 5, such as for example incandescent bulbs, to be extended.

The current through the item of equipment 5 is controlled so as to be at maximum intensity Imax when $\gamma=100\%$ and at minimum intensity Imin when $\gamma=0\%$.

The mean intensity of the current flowing through the item of equipment 5 for a given duty cycle will be equal to $(Imax-Imin) \times (\gamma)$.

Each driver interface 120, commonly referred to by the term "driver", is configured to control an item of electrical equipment 5 to which it is connected by an output connector 130 on the basis of an electrical signal generated by said microcontroller 110. This driver interface 120 takes the form of an electronic circuit allowing current to be delivered to the item of equipment 5 according to on-off switching performed by a transistor or a relay, for example. Such a driver interface 120 is characterized by a maximum operating temperature threshold $T_{SF}$ (with reference to FIG. 4), for example of the order of 150° C., beyond which it becomes inoperative.

In practice, when the ambient temperature is high and/or the items of electrical equipment 5 of the motor vehicle 1 are in operation, the driver interfaces 120 may have an internal temperature T that is higher than the maximum operating temperature threshold $T_{SF}$, thereby deactivating them.

More specifically, depending on the type of driver interface 120, some driver interfaces 120 may be destroyed if the maximum operating temperature threshold $T_{SF}$ is reached, while some other driver interfaces 120 have an integrated thermal trip that inhibits their operation until their internal temperature T falls back below a previously defined temperature threshold and yet other driver interfaces 120 have an integrated thermal trip that definitively inhibits their operation.

As such, in order to keep the driver interfaces 120 operational, their internal temperature T must not exceed the maximum operating temperature threshold $T_{SF}$.

An aspect of the invention therefore aims to monitor the internal temperature T of the driver interface 120 in order to prevent the deactivation thereof.

Thus, according to an aspect of the invention, the microcontroller 110 is configured to determine the internal temperature T of the driver interface 120 in order to compare said determined internal temperature T with a first predetermined warning threshold $T_{S1}$ and to decrease the duty cycle γ of the electrical signal when the first warning threshold $T_{S1}$ has been exceeded. Decreasing the duty cycle γ allows the power of the electrical signal to be limited and hence the internal temperature T of the driver interface 120 to be kept below its maximum operating temperature threshold $T_{SF}$.

In this example, the microcontroller 110 is also configured to compare the determined internal temperature T with a second predetermined warning threshold $T_{S2}$, which is lower than or equal to the first warning threshold $T_{S1}$, and to increase the duty cycle γ of the electrical signal when the internal temperature of the driver interface is below said second warning threshold $T_{S2}$ so as to maintain a duty cycle γ that is as high as possible and thus ensure the efficiency of the items of electrical equipment 5 of the motor vehicle.

In a first embodiment, the driver interface 120 comprises a sensor 120A for measuring its internal temperature T.

In a second embodiment, the device 10 comprises, outside the driver interfaces 120, a module 140 for measuring its ambient temperature $T_C$.

Figure 2:
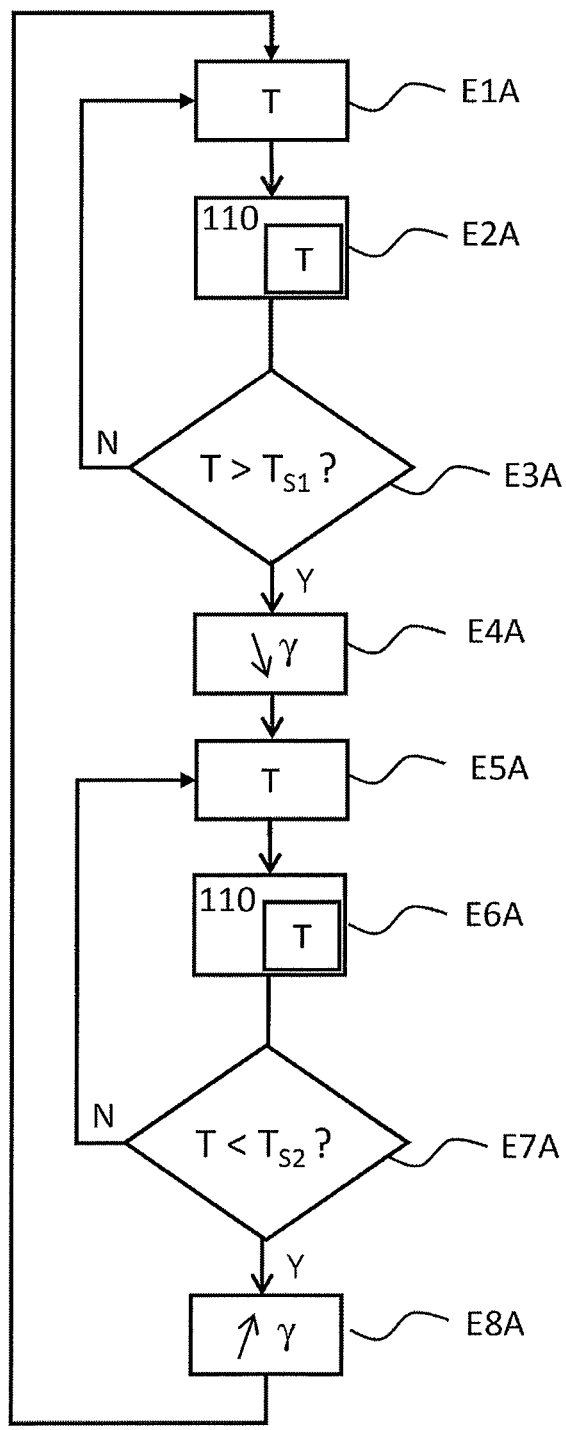
FIG. 2 illustrates a first embodiment of the method according to an aspect of the invention.
Figure 3:
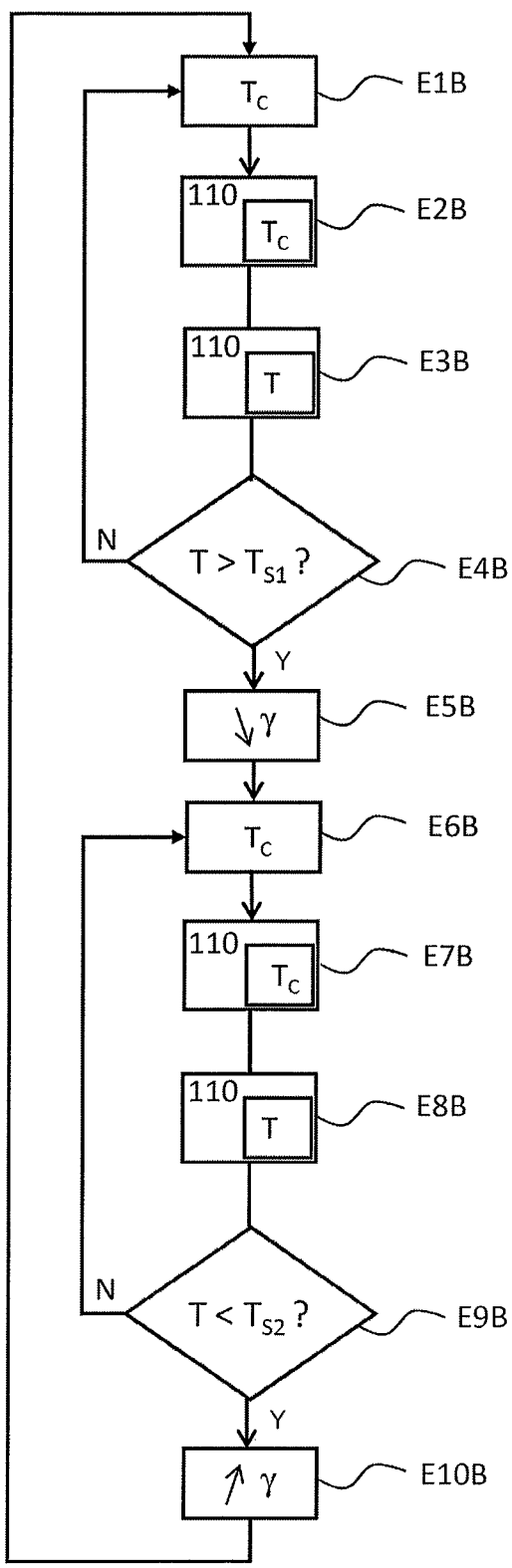
FIG. 3 illustrates a second embodiment of the method according to an aspect of the invention.

An aspect of the invention will now be described in the implementation thereof with reference to FIGS. 2 to 4. By way of example, each driver interface 120 is taken to have a maximum operating threshold $T_{SF}$ of 150° C. and a first warning threshold $T_{S1}$ is set at 140° C. and a second warning threshold $T_{S2}$ is set at 135° C.

In the first embodiment, each driver interface 120 comprises a sensor 120A for measuring its internal temperature T.

First, in a step E1A, each driver interface 120 measures its internal temperature T using its measurement sensor 120A and then sends this measurement to the microcontroller 110 in a step E2A.

In a step E3A, the microcontroller 110 then compares each of the measurements taken with the first warning threshold $T_{S1}$ of 140° C. When the internal temperature T of one or more of the driver interfaces 120 exceeds the first warning threshold $T_{S1}$, the microcontroller 110 modifies, in a step E4A, the signal for controlling the associated items of electrical equipment 5 so as to decrease the duty cycle γ thereof, for example by 10% to 20%.

Decreasing the duty cycle γ of the control signals allows the intensity of these signals to be decreased and hence the internal temperature T of the corresponding driver interfaces 120 to be decreased. For example, the drop in intensity of the control current results in a loss of power in the headlights of the vehicle 1 but allows them to remain operational, thereby enhancing the safety of the vehicle. It will be noted that the value of the decrease in the duty cycle γ must be chosen such that it ensures that the internal temperature T remains below the maximum operating temperature threshold $T_{SF}$ of the driver interfaces 120. This choice may for example be empirically predetermined.

In practice, the duty cycle γ of the electrical signal is preferably taken to decrease inversely proportionally to the ratio of the internal temperature T of the driver interface 120 to the first warning threshold $T_{S1}$. In other words, if the internal temperature T of the driver interface reaches 90% of the first warning threshold $T_{S1}$ then the duty cycle γ is decreased by 10%.

In a step E5A, each driver interface 120 periodically measures its internal temperature T again and then sends this measurement to the microcontroller 110 in a step E6A.

In a step E7A, the microcontroller 110 then compares each of the measurements taken with the second warning threshold $T_{S2}$ of 135° C. When the internal temperature T of one or more of the driver interfaces 120 falls below the second warning threshold $T_{S2}$, the microcontroller 110 modifies, in a step E8A, the signal for controlling the associated items of electrical equipment 5 so as to increase the duty cycle γ thereof, for example up to its initial value, such that the intensity of the current of the control signals and hence the power of the items of electrical equipment 5 increase once again, and then continues to measure the internal temperature T of the driver interfaces 120 periodically (return to step E1A).

In the second embodiment, the device 10 comprises a module 140 for measuring its ambient temperature $T_C$ that is connected to the microcontroller 110 and is external to the driver interfaces 120.

First, in a step E1B, the measurement module 140 measures the ambient temperature $T_C$ of the device 10 and then sends this measurement to the microcontroller 110 in a step E2B.

The microcontroller 110 then calculates an estimate of the internal temperature T of the driver interfaces 120 in a step E3B on the basis of the measured ambient temperature $T_C$ of the device 10.

This estimate may be made using a mathematical relation expressing the internal temperature T of the driver interface 120 as a function of the ambient temperature $T_C$ of the device 1: $T=f(T_C)$. This relation may for example be obtained by using a linearization table resulting (for example by means of an empirical method) from a prior characterization of the ambient temperature $T_C$ as a function of the duty cycle γ ($T_C=f(\gamma)$) and from a prior characterization of the internal temperature T of the driver interface 120 as a function of the duty cycle γ ($T=f(\gamma)$). It will be noted that any other suitable method for expressing the internal temperature T of the driver interface 120 as a function of the ambient temperature $T_C$ of the device 10 could be used.

In a step E4B, the microcontroller 110 then compares the calculated estimate of the temperature T with the first warning threshold $T_{S1}$ of 140° C. When the estimated internal temperature T of the driver interfaces 120 exceeds the first warning threshold $T_{S1}$, the microcontroller 110 modifies, in a step E5B, the signal for controlling the associated items of electrical equipment 5 so as to decrease the duty cycle γ thereof, for example by 10% to 20%.

In the same way as above, decreasing the duty cycle γ of the control signals allows the intensity of these signals to be decreased and hence the internal temperature T of the corresponding driver interfaces 120 to be decreased. The drop in intensity of the control current results in a loss of power in the headlights of the vehicle 1 but allows them to remain operational. As above, the value of the decrease in the duty cycle γ must be chosen, for example empirically, such that it ensures that the internal temperature T remains below the maximum operating temperature threshold $T_{SF}$ of the driver interfaces 120.

In a step E6B, the measurement module 140 again measures the ambient temperature $T_C$ of the device 10 and then sends this measurement to the microcontroller 110 in a step E7B.

The microcontroller 110 then calculates an estimate of the internal temperature T of the driver interfaces 120 in a step E8B.

In a step E9B, the microcontroller 110 then compares the calculated estimate of the temperature T with the second warning threshold $T_{S2}$ of 135° C. When the estimated internal temperature T of a driver interface 120 falls below the second warning threshold $T_{S2}$, the microcontroller 110 modifies, in a step E10B, the signal for controlling the associated item of electrical equipment 5 so as to increase the duty cycle γ thereof, for example up to its initial value, such that the intensity of the current of the control signals and hence the power of the items of electrical equipment 5 increase once again. The measurement module 140 next measures the ambient temperature $T_C$ of the device 10 again (return to step E1B).

Figure 4:
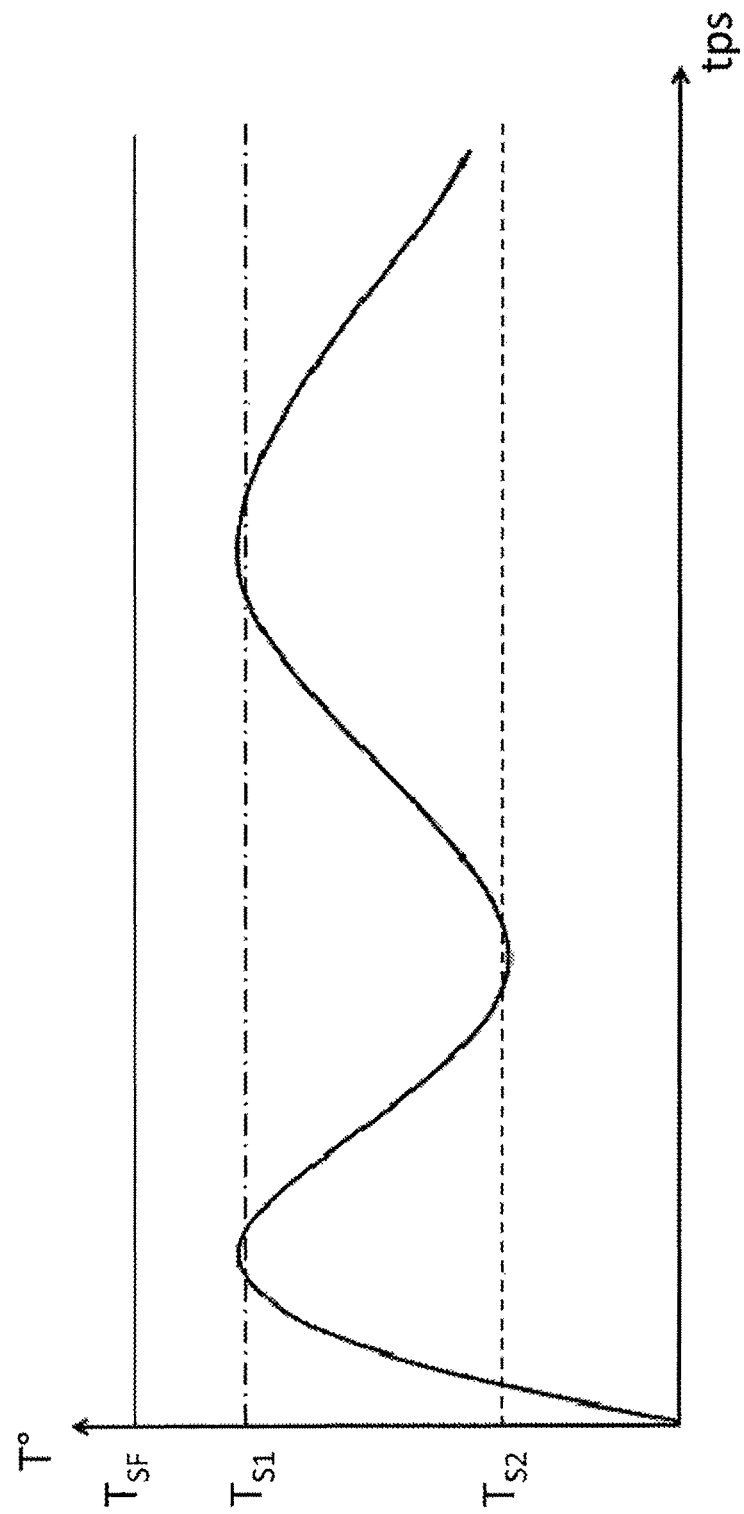
FIG. 4 graphically illustrates an example of the variation in the temperature of a driver interface when implementing the control method according to an aspect of the invention.

As shown in FIG. 4, this operation of comparing the measured or calculated internal temperature T of the driver interface 120 with the temperature values corresponding to the first warning threshold $T_{S1}$ and to the second warning threshold $T_{S2}$ is repeated cyclically over the entire duration of operation of the driver interface 120. The duty cycle γ of the AC electrical signal for controlling the item of electrical equipment 5 is thus regularly adjusted, downwardly or upwardly, in order to regulate the internal temperature T of the associated driver interface 120 and thus to prevent it from being deactivated and hence the item of electrical equipment 5 ceasing to operate.

The invention claimed is:

1. A method for controlling at least one item of electrical equipment of a motor vehicle, said motor vehicle comprising a device for controlling said item of electrical equipment, said device comprising a microcontroller that is configured to generate an AC electrical signal for controlling the item of electrical equipment, said signal being characterized by its duty cycle, the device comprising at least one driver interface that is configured to control the item of electrical equipment on the basis of the AC electrical signal generated by said microcontroller, said driver interface being characterized by a maximum operating temperature threshold beyond which the driver interface is inoperative, said method comprising:
    determining an internal temperature of the driver interface;
    comparing the determined internal temperature with a first warning threshold;
    decreasing the duty cycle of the AC electrical signal prior to the first warning threshold being exceeded so as to limit the power of the AC electrical signal for controlling the item of electrical equipment and thus to keep the internal temperature of the driver interface below its maximum operating temperature threshold, wherein the decrease in the duty cycle of the AC electrical signal prior to the first warning threshold being exceeded is inversely proportional to a ratio of the internal temperature of the driver interface to the first warning threshold; and
    subsequent to the decreasing of the duty cycle of the AC electrical signal, increasing the duty cycle of the AC electrical signal when the internal temperature of the driver interface is lower than a second warning threshold which is less than the first warning threshold, the second warning threshold is set to ensure an operating efficiency of the item of electrical equipment.

2. The method as claimed in claim 1, wherein, the driver interface comprising a sensor for measuring its internal temperature, the internal temperature of the driver interface is determined by directly measuring said internal temperature by said measurement sensor.

3. The method as claimed in claim 1, wherein, the device comprising a module for measuring the ambient temperature of said device, outside the driver interface, the method comprises a step of measuring the ambient temperature of the device by said measurement module, the internal temperature of the driver interface then being determined by applying a mathematical relation to the measured ambient temperature.

4. The method as claimed in claim 1, wherein, the device comprises a module for measuring the ambient temperature of said device, outside the driver interface, the method further comprises measuring the ambient temperature of the device by said measurement module, the internal temperature of the driver interface then being determined by applying a mathematical relation to the measured ambient temperature.

5. A device for controlling at least one item of electrical equipment of a motor vehicle, said device comprising:
    a microcontroller that is configured to generate an AC electrical signal for controlling the item of electrical equipment, said signal being characterized by its duty cycle; and
    at least one driver interface that is configured to control the item of electrical equipment on the basis of the AC electrical signal generated by said microcontroller, said driver interface being characterized by a maximum operating temperature threshold beyond which the driver interface is inoperative,
    wherein the microcontroller is further configured to:
        determine the internal temperature of the driver interface, to compare the determined internal temperature with a first warning threshold and to decrease the duty cycle of the AC electrical signal prior to the first warning threshold being exceeded so as to limit the power of the AC electrical signal for controlling the item of electrical equipment and thus to keep the internal temperature of the driver interface below its maximum operating temperature threshold, wherein the decrease in the duty cycle of the AC electrical signal prior to the first warning threshold being exceeded is inversely proportional to a ratio of the internal temperature of the driver interface to the first warning threshold, and
        subsequent to the decreasing of the duty cycle of the AC electrical signal, increasing the duty cycle of the AC electrical signal when the internal temperature of the driver interface is lower than a second warning threshold which is less than the first warning threshold, the second warning threshold is set to ensure an operating efficiency of the item of electrical equipment.

6. The device as claimed in claim 5, wherein the microcontroller is configured to compare the determined internal temperature with a second warning threshold, which is lower than or equal to the first warning threshold, and to increase the duty cycle of the AC electrical signal when the internal temperature is lower than said second warning threshold so as to maintain a duty cycle that is as high as possible and thus ensure the efficiency of the items of electrical equipment of the motor vehicle.

7. The device as claimed in claim 6, wherein the device comprises a module for measuring the ambient temperature of said device.

8. The device as claimed in claim 6, wherein the driver interface comprises a sensor for measuring its internal temperature.

9. The device as claimed in claim 5, wherein the driver interface comprises a sensor for measuring its internal temperature.

10. The device as claimed in claim 5, wherein the device comprises a module for measuring the ambient temperature of said device.

11. A motor vehicle comprising a device as claimed claim 5 and at least one item of electrical equipment that is electrically connected to said device in order to be controlled by said device.

\* \* \* \* \*